C. S. HORTON.
GLARE DEFLECTOR.
APPLICATION FILED NOV. 16, 1917.
1,273,934.
Patented July 30, 1918.
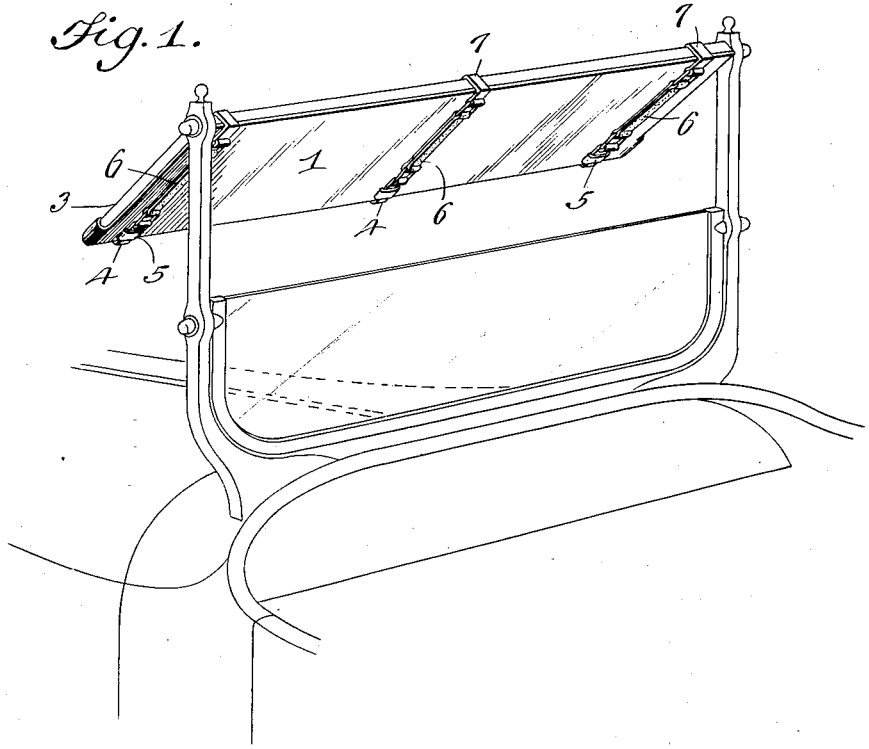
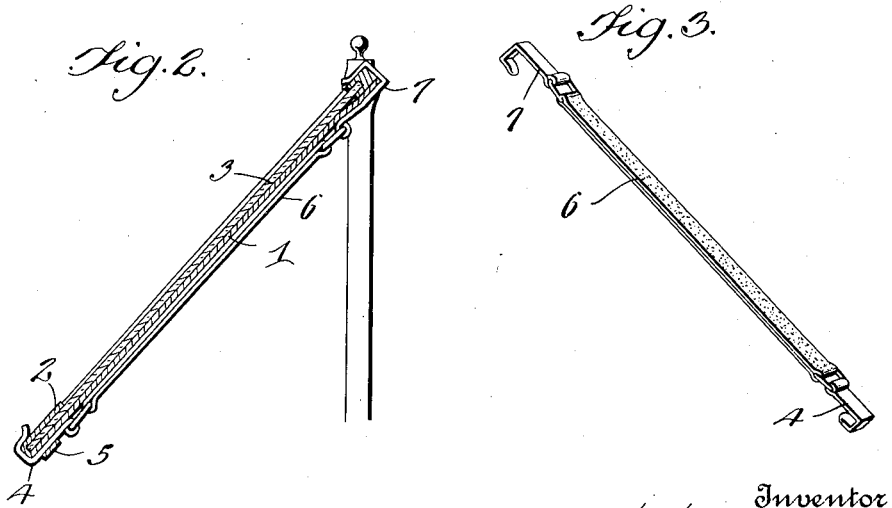
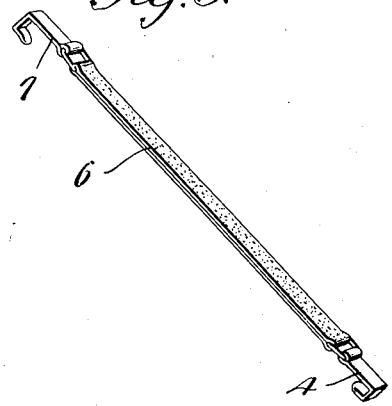
Witnesses
Inventor
C. S. Horton,
By Victor J. Evans
Attorney

UNITED STATES PATENT OFFICE.

CHARLES S. HORTON, OF HUNTLEY, MONTANA.

GLARE-DEFLECTOR.

1,273,934.          Specification of Letters Patent.     Patented July 30, 1918.

Application filed November 16, 1917. Serial No. 202,378.

*To all whom it may concern:*

Be it known that I, CHARLES S. HORTON, a citizen of the United States, residing at Huntley, in the county of Yellowstone and State of Montana, have invented new and useful Improvements in Glare-Deflectors, of which the following is a specification.

This invention relates to glare deflectors especially adapted to be used upon the transparent wind shield of an automobile machine and it consists in the novel features hereinafter described and claimed.

An object of the invention is to provide a device of the character stated which is of simple structure and which will effectually protect the eyes of a person driving an automobile, against direct rays of light from the sun and from reflection of light from the road against the wind shield.

With this object the protector comprises a canopy adapted to be applied to the upper under surface of the upper portion of the wind shield, the said canopy having at its forward edge a pocket adapted to receive the forward edge portion of the said shield. Securing devices are mounted upon the canopy and are adapted to be clasped about the forward and rear edges of the wind shield whereby the deflector is securely held in position upon the same.

In the accompanying drawing:—

Figure 1 is a perspective view of the wind shield of an automobile showing the deflector applied;

Fig. 2 is a transverse sectional view of the same.

Fig. 3 is a perspective view of one of the securing devices.

As illustrated in the accompanying drawing the deflector comprises a strip 1 of cloth or other suitable material which is preferably of dark green or dark blue color. The said strip is provided at its forward edge with a fold 2 which is secured at its ends to the end portion of the strip 1 thereby providing a pocket adapted to receive the forward edge portion of the wind shield 3.

Clips 4 are secured to the forward portion of the cloth 1 by means of loops 5 which are preferably sewed to the said cloth and the said clips 4 are adapted to be engaged around the said pocket whereby the forward edge portion of the shield 3 is confined in the pocket. Elastic strips 6 are connected at their forward ends with the clips 4 and are adapted to lie against the surface of the cloth 1. Clips 7 are connected with the rear ends of the elastic strips 6 and are adapted to be engaged over the upper rear edge of the shield 3 when the elastic strips 6 are stretched and thus the cloth 1 is securely held in position upon the shield 3. The shield 3 may be tilted to any desired angle and secured and the operator of the machine may observe the road in advance of the machine by looking under the forward edge of the shield.

Hence it will be seen that the cloth 1 will protect the eyes of the operator of the machine and at the same time the presence of the deflector upon the wind shield will not obstruct the vision of the operator of the machine.

Having described the invention what is claimed is:—

A light deflector adapted to be applied to the wind shield of an automobile comprising a strip of cloth having at one edge a pocket adapted to receive one edge portion of the wind shield whereby the body of the strip of cloth may extend along the underside of the shield, and means applied to the cloth and adapted to engage around the shield at one edge and the pocket at the opposite edge of the shield whereby the body of the strip of cloth is held in close contact with the underside of the shield.

In testimony whereof I affix my signature.

CHARLES S. HORTON.